Jan. 7, 1964 C. E. ANDERSON ETAL 3,117,188
ROTATING HEAD SWITCHER
Filed Sept. 12, 1961
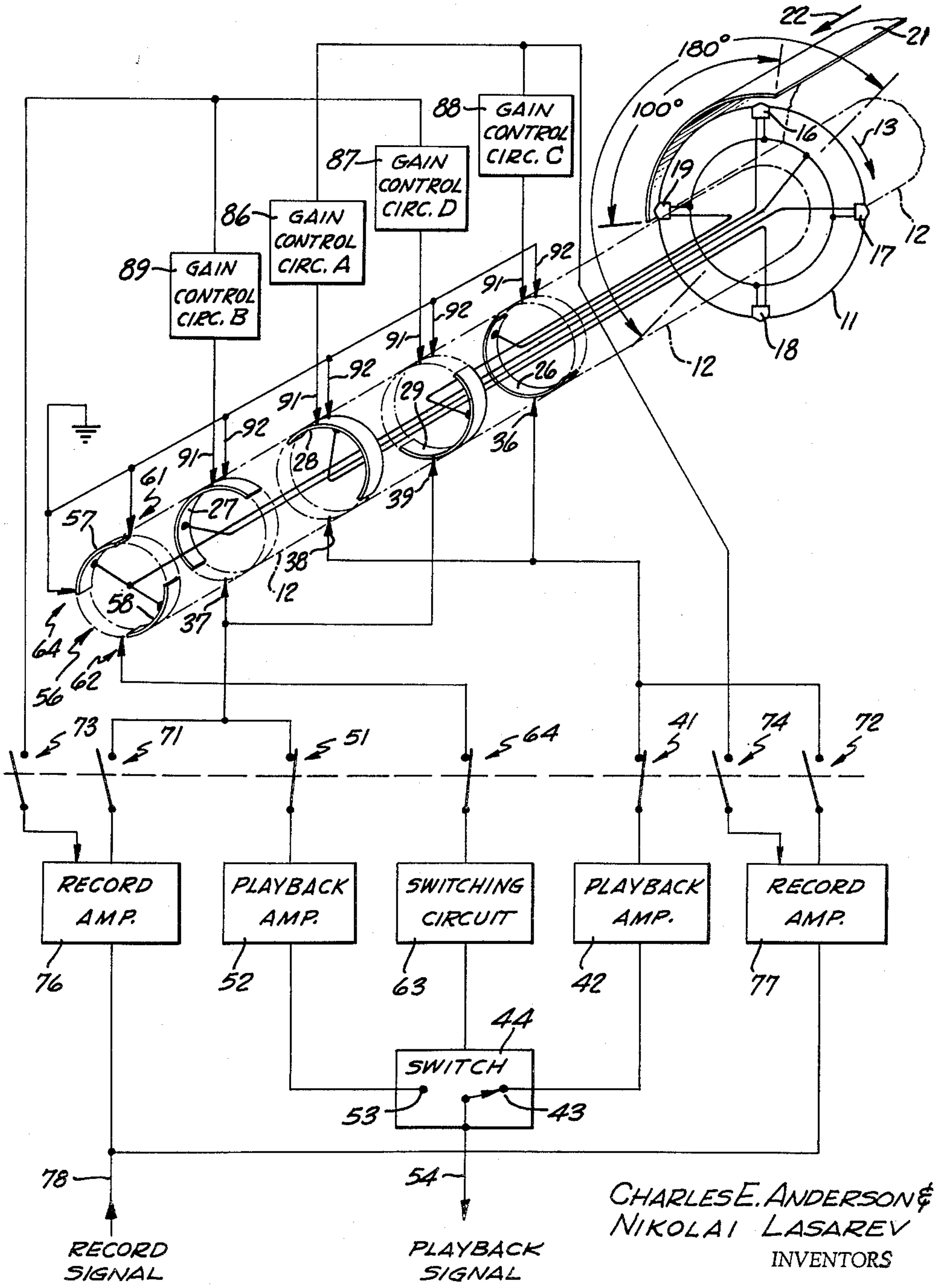
CHARLES E. ANDERSON & NIKOLAI LASAREV
INVENTORS
BY Robert G. Clay
ATTORNEY United States Patent Office 3,117,188

Patented Jan. 7, 1964

3,117,188

ROTATING HEAD SWITCHER

Charles E. Anderson, San Carlos, and Nikolai Lasarev, Palo Alto, Calif., assignors to Ampex Corporation, Redwood City, Calif., a corporation of California Filed Sept. 12, 1961, Ser. No. 137,679
14 Claims. (Cl. 179—100.2)

This invention relates to rotating magnetic transducers and switching means therefor.

Rotating magnetic transducer assemblies, particularly as used in magnetic tape broadband and television recorders, usually include a rotating drum with four equispaced transducers on the periphery thereof. The magnetic tape is guided to move longitudinally in the direction of the axis of the drum and to be transversely curled to conform to the curvature of the disc periphery, so that each head sequentially sweeps transversely across the width of the tape in contact therewith.

During the recording process the signal to be recorded is transmitted concurrently to all four of the heads so that whichever head is in contact with the tape records the signal on the tape. The tape extends over an arc of more than 90 degrees with respect to the drum, so that often two heads are recording at the same time on different transverse tracks, for example, one head just coming on to the tape while the preceeding head is leaving the tape; and the signal is recorded in duplicate near the edges of the tape.

However when it is desired to play back the tape, several problems arise. First, any of the heads that are not in contact with the tape at a given moment may pick up stray noise as a result of unpredictable magnetic fields in the area; and, consequently, it is better for such heads to be disconnected from the recorder playback circuits except when they are actually reading out portions of the tape-recorded signal. Second, it is not desirable to have any of the heads in a transmitting condition when they first enter a transverse sweep of the tape, because when a head first comes on to the tape a spurious transient signal is generated, which is not part of the recorded information signal and must be eliminated.

Some devices of the art attempt to solve these problems by connecting each head to a separate slip ring, so that the signal from each slip ring can be transmitted through a four-way switch to the utilization circuit, beginning substantially after the head has begun its traverse across the tape. The head is then disconnected and the next head is connected after a further 90-degree rotation of the drum, the tape covering approximately 100 degrees of arc of the drum. However this arrangement requires a very complicated four-way switch as well as a four-channel amplifier, and is both costly and bulky.

In another device, each head is connected to a separate segment of a four-segment commutator engaged by two circumferentially spaced brushes that in turn are connected to an electronic switch. When both brushes are engaging the same segment, only the trailing brush is conducting; when the leading brush crosses a commutator gap it is switched to be conducting and the trailing brush is switched off; and when the trailing brush has also crossed the gap, it is switched on again and the leading brush is switched off.

In another device, each head is connected through a solar cell mounted on the rotating drum and in series with the base of a semiconductor, the emitter and collector leads of the four semiconductors being connected in series through a slip ring assembly and to the utilization circuit. In this arrangement a source of light is mounted near the rotating assembly, so that each solar cell in turn is energized to cause the associated head to be conductingly connected to the utilization circuit.

In still another device, each head is connected through a slip ring to a corresponding saturable core transformer, the secondaries of the transformers being connected in series and the common output being fed to an amplifier and demodulator. Each transformer has a saturating winding by means of which a sequential switcher operating in synchronism with the rotary head drum causes the transformers to become active one at a time as their corresponding heads come onto the tape.

However, none of these arrangements provides the simplicity and reliability of playback operation desired.

With respect to the recording process, certain other difficulties arise. It has been found that each transducing head has individual recording characteristics and that the recording signal current must be varied accordingly to produce uniformity in the actual magnetic recording on the tape. When all four heads are receiving signal current at the same time, then each head must have an amplifier of its own, the gain of the amplifier being individually adjusted to the characteristics of the head, and the provision of this large number of amplifiers is wasteful of space and material.

Accordingly, it is an object of the present invention to provide a rotary head switching arrangement for use in the playback mode to sequentially connect each rotating head with a utilization circuit at a time substantially after the head has entered its arc of traverse across the tape, and for disconnecting the head substantially before it ends its traverse across the tape, with the immediately following head being connected at the same instant.

It is another object of the invention to provide, in combination with the above, a recording arrangement in which each head records entirely across the tape, the arrangement being characterized by fewer, less expensive and less bulky components.

It is a further object of the invention to provide a switching arrangement as above described and requiring only two amplifiers for the record mode and two amplifiers for the play mode instead of four for each mode.

A switching apparatus in accordance with the present invention comprises a 180-degree commutation segment connected to each head, the segments corresponding to diametrically opposite heads being connected through brushes and in parallel to separate terminals of a two-way switch, so that the playback switching and amplifying operations are reduced and the system otherwise meets all the requirements listed above for operation in the play mode. In the record mode the same segments are used to conduct the recording current to the transducers, and are further used with a different set of brushes to energize and de-energize gain-control circuits for the record amplifiers, which are reduced in number.

Further objects and advantages together with a better understanding of the invention may be had by reference to the following description, taken in conjunction with the accompanying drawing, in which:

The sole FIGURE is a perspective view of a switching apparatus constructed in accordance with the invention, showing in schematic form the connections of various components.

The drawing shows the apparatus as it would be connected for operation in the playback mode.

Referring now to the drawing, there is shown a rotation drum 11 mounted on a shaft 12 for rotation, here shown as in a clockwise direction as illustrated by arrow 13. On the circumference of the drum are mounted four magnetic heads 16, 17, 18 and 19. A magnetic tape 21 is shown curled transversely around the circumference of the drum so that each head in rotation traverses the entire width of the tape. Of course the tape is also moving lengthwise, as illustrated by the arrow 22, so that each head sweeps a separate transverse track in crossing the tape.

On the shaft 12 are mounted four 180-degree commutation segments 26, 27, 28 and 29, which are engaged in rotation by corresponding brushes 36, 37, 38 and 39. The heads are connected as follows:

Head 16 is connected to segment 26, which is arranged to be in contact with brush 36 throughout the 180-degree rotation of the head 16 that includes the 100-degree span of the tape 21. The diametrically opposite head 18 is connected to segment 28, which also is arranged to be engaged by its corresponding brush 38 during the period when head 18 is making the 180-degree traverse that includes the 100-degree span of the tape. Brushes 36 and 38 are connected in parallel and thence in series through a switch 41 to a playback amplifier 42 and one pole 43 of a two-way electronic switch 44.

Heads 17 and 19 are similarly connected through segments 27 and 29 and brushes 37 and 39 respectively, a switch 51 and playback amplifier 52, to the other pole 53 of the two-way electronic switch 44. The output 54 of the switch 44 is connected to the utilization or playback circuit.

It will be seen that, because the commutation segments 26 are only 180 degrees in length, it is impossible for more than one of a pair of diametrically opposite heads (e.g., heads 16, 18) to be connected through the amplifier and electronic switch to the utilization circuit at any one time. For example, when communication segment 26 engages brush 36, then commutation segment 28 is at the same time disengaged from brush 38. Thus even though the two brushes are connected in parallel to the amplifier 42, only the signal from the one head 26, whose segment is engaged with its brush, is transmitted to the amplifier and switch 44. It will be seen also that of any pair of adjacent heads (e.g., heads 16 and 19) that are both at the same time traversing the tape 21, only one is connected to the utilization circuit because each head (16, 19) is connected to a different pole (43, 53) of the switch 44. For example, head 16 is connected to pole 43 of the switch 44 while both of the adjacent heads 19 and 17 are connected to pole 53 on switch 44.

To time the apparatus for proper operation, it is necessary to throw the switch 44 from one terminal to another each time a new rotating head enters its traverse across the tape. The timing is arranged as follows: On the shaft 12 is mounted a fifth commutating element 56, comprising a pair of diametrically opposite 90-degree commutation segments 57 and 58, electrically coupled together. A pair of circuit completion brushes 61 and 62 are mounted for cyclically engaging the segments 61 and 62 whenever one of the diametrically opposite pair of transducers 17, 19 is rotating through the 90-degree angle included by the span of the tape 21. The brush 61 is connected to ground, and the brush 62 is connected to a switching circuit 63 through a switch 64, so as to complete an energizing circuit for the switching circuit 63 whenever the segments 57—58 are engaged by the brushes 61—62. The switching circuit 63 is arranged to reverse the polarity of connection of the switch 44 upon each completion and interruption of the circuit through brushes 61—62 and segments 57—58. The apparatus as illustrated in the drawing is in a condition wherein the head 16 has been connected through the 180-degree commutation segment 26, amplifier 42 and switch 44 to transmit the play signal produced by the head 16. At this instant the head 16 is about to be disconnected as by operation of the switch 44, and the next following head 19 is about to be connected through the 180-degree commutation segment 29, the amplifier 52 and the switch 44. Also at this instant the segment 57 is about to come into engagement with the brush 61 and the segment 58 is about to come into engagement with the brush 62, so as to complete the energizing circuit for circuit 63 and to thus change the polarity of connection of the switch 44 so that the terminal 53 thereof is made part of the operation circuit instead of the terminal 43. Thus the head 19 will be connected through to the output utilization circuit and the head 16 will be simultaneously disconnected. Upon a further 90-degree rotation of the shaft 12, the head 18 will come into the tape, the segment 58 will be disengaged from the brush 62, the switching circuit 63 will reverse the polarity of the switch 44 so as to reconnect amplifier 42 through terminal 43 to the output line 44. The head 18 thereupon will be connected through segment 28 to the amplifier 42 to transmit its pick-up signal; but the head 16 will still be unconnected because segment 26 will not be engaging brush 36. Thus the commutating element 56 forms a drum-position sensing means for controlling the action of switch 44.

The commutating element 56 is further taken advantage of to provide a ground connection for the heads 16–19. It will be seen that the ground lines of the heads 16–19 are connected in parallel to the two 90-degree segments 57—58. A third brush 64 is provided at a 90-degree angle to the brush 61 and is also connected to ground. Thus there is no instant during the rotation of shaft 12 when one of the segments 57—58 is not connected to ground, and the ground lines of all of the heads 16–19 are continuously grounded. This arrangement does not affect the connection and disconnection of the switch circuit 63, which is controlled by the brush 62 coming into and out of contact with the segments 57—58 four times during each revolution of the shaft 12.

It will be seen that in this arrangement, making use of the four 180-degree commutation segments 26–29 instead of the four 360-degree slip rings previously used in the art, it becomes possible to coordinate the switching of the apparatus in such a way that only two playback amplifiers 42, 52 are needed instead of the four previously used.

This same feature, the use of 180-degree segments, has an analogous advantage in the connection of the apparatus for recording operation as well.

To arrange the apparatus for recording, the switches 41, 51 and 64 are opened and a set of switches 71, 72, 73 and 74 are closed. The switches 71, 72 when closed connect a pair of record amplifiers 76 and 77 to the brushes 37, 39 and the brushes 38, 36 respectively. The record amplifiers 76, 77 are connected in parallel to a record input line 78 to receive the recording signal. It will be seen that by this arrangement, each of the transducing heads 16–19 is connected to produce a recording action during the rotation of the segment through the 180-degree angle that includes the tape 21, and thus records a full track across the entire width of the tape. It will be seen however that, because the segments 26, 28 (for example) are only 180–degree segments, only one of the diametrically opposite heads 16, 18 is connected to the amplifier 77 at any instant. Thus the amplifier 77 serves alternately as the record current amplifier for the head 16 and the head 18; and similarly the record amplifier 76 serves alternately as the record amplifier for the heads 19 and 17. To make this alternating use of the amplifiers possible, each amplifier must be especially adjusted for each head at the time it is connected to the head. The manner in which this adjustment is made is as follows.

Each head 16–19 has a corresponding gain control circuit 86, 87, 88 and 89 respectively. The gain control circuits 86, 88 are connected in parallel through the switch 74 to control the gain of amplifier 77; and the gain control circuits 87 and 89 are connected in parallel through switch 73 to control the gain of amplifier 76. Each gain control circuit is individually set to match the characteristics of the corresponding transducing head. Also each gain control circuit is arranged to be connected through one of the 180-degree commutation segments 26, 29 to ground so as to be energized whenever the corresponding head is rotating through the 180-degree angle including the tape 21. For example, gain control circuit 86 corresponding to head 16 is connected to one of a pair of circuit completion brushes 91, 92, and the other of which is connected to ground; and the brushes 91, 92 are arranged to engage the 180-degree segment 28 during the period when the brush 36 is engaging the 180-degree segment 26. Although the segment 28 actually pertains in one sense to the head 18, which is diametrically opposite to the head 16, the arrangement nevertheless insures that the gain control circuit 86 pertaining to the head 16 operates during the same period of time that the head 16 is recording, so as to control the gain of the corresponding record amplifier 77 according to the characteristics of the head 16. The gain control circuit 88, corresponding with the head 18 is connected through a pair of brushes 91, 92 to control the gain of amplifier 77 when the brushes are engaged with segment 26. When these brushes are engaging the segment 26, it is the segment 28 corresponding with the head 18 that is connected to the amplifier 77. The gain control circuits 87 and 89 are similarly connected to be energized when their corresponding brushes 91, 92 are engaging the segments 27 and 29 respectively so as to alternately control the gain of amplifier 76 in accordance with the individual characteristics of heads 17 and 19 respectively.

Thus, there has been described a rotating head switching apparatus including a means coupled to each of the heads for use during the playback process for transmitting the response signals thereof during rotation of the head through a predetermined angle substantially greater than and including the span of the tape, this angle being substantially less than 360 degrees; and switching means for receiving the signal and for passing a portion of the signal corresponding to rotation of the head through a predetermined angle included by and substantially smaller than the span of the tape; together with a means cooperating with the first-named means to control the amplifier gain for the various transducing heads during the recording process.

What is claimed is:

1. Apparatus for connecting and disconnecting a utilization circuit and a plurality of magnetic transducers rotating transversely across a magnetic tape, comprising: means coupled to each of said transducers for transmitting the response signal thereof during rotation of said transducer through a predetermined angle substantially greater than and including the span of said tape; and means coupled to said first-named means and to said utilization circuit for receiving said response signal and for passing a portion thereof corresponding to rotation of said transducer through a predetermined angle included by and substantially smaller than the span of said tape, said angles being substantially less than 360 degrees.

2. Apparatus for connecting and disconnecting a utilization circuit and a plurality of magnetic transducers rotating transversely across a magnetic tape, comprising: means coupled to each of said transducers for transmitting the response signal thereof during rotation of said transducer through a predetermined angle substantially less than 360 degrees but greater than and including the span of said tape; and means coupled to said first-named means and to said utilization circuit for receiving said response signal and for cyclically completing and breaking a circuit so as to pass a portion of said response signal corresponding to rotation of said transducer through a predetermined angle included by and substantially smaller than the span of said tape, said last-named means including means for sensing the rotational orientation of said transducer and means for completing and breaking said circuit in response to indications from said sensing means.

3. Apparatus for connecting and disconnecting playing and recording circuits and a plurality of magnetic transducers rotating transversely across a magnetic tape, comprising: means coupled to each of said transducers for transmitting the response signal thereof during rotation of said transducer through a predetermined angle substantially less than 360 degrees but greater than and including the span of said tape; means coupled to said first-named means and to said utilization circuit for receiving said response signal and for passing a portion thereof corresponding to rotation of said transducer through a predetermined angle included by and substantially smaller than the span of said tape; and means for selectively uncoupling said first and second named means and for coupling said first named means and said recording circuit for recording on said tape.

4. Apparatus for connecting and disconnecting a utilization circuit and a plurality of magnetic transducers rotating transversely across a magnetic tape, comprising: a commutation segment of substantially less than 360 degrees coupled to each of said transducers and mounted for coaxial rotation therewith for transmitting the response signal thereof during rotation of said transducer through a predetermined angle including the span of said tape; and means including a brush coupled to each of said segments and to said utilization circuit for receiving said response signal and for passing a portion thereof corresponding to rotation of said transducer through a predetermined angle included by and substantially smaller than the span of said tape.

5. Apparatus for connecting and disconnecting a utilization circuit and a plurality of magnetic transducers rotating transversely across a magnetic tape, comprising: a commutation segment of substantially less than 360 degrees coupled to each of said transducers and mounted for coaxial rotation therewith for transmitting the response signal thereof during rotation of said transducer through a predetermined angle including the span of said tape; a brush for each segment mounted for cyclic engagement therewith during rotation of the segment through said predetermined angle; means for sensing the rotational orientations of said transducers; and means coupled to said brushes, to said utilization circuit and to said sensing means for receiving said response signal and for passing a portion thereof corresponding to rotation of said transducer through a predetermined angle included by and substantially smaller than the span of said tape.

6. Apparatus for connecting and disconnecting a utilization circuit and four magnetic transducers equispaced on a drum and rotating transversely across a magnetic tape of span substantially greater than 90 degrees and substantially less than 180 degrees, comprising: a commutation segment of substantially 180 degrees coupled to each of said transducers and mounted for coaxial rotation therewith for transmitting the response signal thereof during rotation of said transducer through a 180-degree angle including the span of said tape; a brush for each segment mounted for cyclic engagement therewith during rotation of the corresponding transducer through said 180-degree angle; means for sensing the rotational orientations of said transducers; and means coupled to said brushes, to said utilization circuit and to said sensing means for receiving said response signal and for passing a portion thereof corresponding to rotation of said transducer through a substantially 90-degree angle included by the span of said tape.

7. Apparatus for connecting and disconnecting a utilization circuit and four magnetic transducers equispaced on a drum and rotating transversely across a magnetic tape of span substantially greater than 90 degrees and substantially less than 180 degrees, comprising: a commutation segment of substantially 180 degrees coupled to each of said transducers and mounted for coaxial rotation therewith for transmitting the response signal thereof during rotation of said transducer through a 180-degree angle including the span of said tape; a brush for each segment mounted for cyclic engagement thereby during rotation of the segment through said 180-degree angle; means for sensing the rotational orientations of said transducers; and an electronic switch coupled to said brushes, to said utilization circuit and to said sensing means for receiving said response signal and for passing a portion thereof corresponding to rotation of said transducer through a substantially 90-degree angle included by the span of said tape, said switch being a two-way switch and each input terminal thereof being coupled to a parallel-connected pair of said brushes corresponding with diametrically opposite transducers of said drum.

8. Apparatus for connecting and disconnecting a utilization circuit and four magnetic transducers equispaced on a drum and rotating transversely across a magnetic tape of span substantially greater than 90 degrees and substantially less than 180 degrees, comprising: a commutation segment of substantially 180 degrees coupled to each of said transducers and mounted for coaxial rotation therewith for transmitting the response signal thereof during rotation of said transducer through a 180-degree angle including the span of said tape; a brush for each segment mounted for cyclic engagement therewith during rotation of the corresponding transducer through said 180-degree angle; an electronic switch coupled to said brushes and to said utilization circuit for receiving each response signal and for passing a portion thereof corresponding to rotation of the corresponding transducer through a substantially 90-degree angle included by the span of said tape; said switch being a two-way switch and each input terminal thereof being coupled to a parallel-connected pair of said brushes corresponding with diametrically opposite transducers of said drum; and a drum-position sensing means coupled to said switch for operating said switch to connect said utilization circuit with each of said pair of brushes whenever one of the corresponding transducers begins traversing said 90-degree angle.

9. Apparatus as characterized in claim 8 wherein said drum-position sensing means includes a fifth commutating element mounted for coaxial rotation with said transducers, said element being formed as a pair of diametrically opposite electrically coupled 90-degree commutation segments, and a pair of circuit completion brushes mounted for cyclically engaging said segments whenever either of one diametrically opposite pair of transducers is rotating through said 90-degree angle included by the span of said tape; and means coupled to said brushes and to said switch for operating said switch upon each completion and interruption of the circuit through said brushes.

10. Apparatus for connecting and disconnecting input and utilization circuits and a plurality of magnetic transducers rotating transversely across a magnetic tape, comprising: means coupled to each of said transducers for transmission of a signal during rotation of said transducer through a predetermined angle substantially less than 360 degrees but greater than and including the span of said tape; and means for selectively coupling said first-named means to said input circuit in a recording mode and to said utilization circuit in a playback mode.

11. Apparatus for connecting and disconnecting signal input and utilization circuits and a plurality of magnetic transducers rotating transversely across a magnetic tape, comprising: means coupled to each of said transducers for transmission of a signal during rotation of said transducer through a predetermined angle substantially less than 360 degrees but greater than and including the span of said tape; and means for selectively coupling said first-named means to said input circuit in a record mode and to said utilization circuit in a playback mode, said last-named means including means coupled to said first-named means and to said signal input circuit for regulating the input signal to each of said transducers during the rotation of said transducer through said predetermined angle in said record mode; and means coupled to said first-named means and to said utilization circuit for receiving a response signal therefrom during the rotation of each transducer through said predetermined angle in said playback mode and for passing a portion of said response signal corresponding to rotation of said transducer through a predetermined angle included by and substantially less than the span of said tape.

12. Apparatus for connecting and disconnecting a signal input circuit and a plurality of magnetic transducers rotating transversely across a magnetic tape, comprising: means coupled to said signal input circuit and to each of said transducers for transmitting said signal thereto during rotation of said transducer through a predetermined angle substantially less than 360 degrees but greater than and including the span of said tape; and means coupled to said first-named means and to said signal input circuit for regulating said signal to each of said transducers during the rotation of said transducer through said predetermined angle.

13. Apparatus for connecting and disconnecting a signal input circuit and a plurality of magnetic transducers rotating transversely across a magnetic tape and spaced apart for an angle less than the span of said tape, comprising: means for coupling said signal input circuit to each of said transducers for transmitting said signal thereto and for thereby rendering said transducer active during rotation of said transducer through a predetermined angle substantially less than 360 degrees but greater than and including the span of said tape; and means coupled to said first-named means and to said signal input circuit for regulating said signal to each of said transducers during the rotation of said transducer through said predetermined angle, said last-named means including a number of amplifiers corresponding to the maximum number of active transducers rotating through said predetermined angle at one time, each of said active transducers being coupled through said first-named means to a corresponding amplifier, and all of said amplifiers being coupled to said input circuit, and means coupled to said first-named means and to said amplifiers for controlling the gain of each amplifier according to predetermined individual characteristics of the particular active transducer to which said amplifier is coupled.

14. Apparatus for connecting and disconnecting a signal input circuit and four magnetic transducers equispaced on a drum and rotating transversely across a magnetic tape of span substantially greater than 90 degrees and substantially less than 180 degrees, comprising: a commutation segment of substantially 180 degrees coupled to each of said transducers and mounted for coaxial rotation therewith for transmitting an input signal thereto during rotation of said transducer through a 180-degree angle including the span of said tape; a brush for each segment mounted for cyclic contact therewith during rotation of the corresponding transducer through said 180-degree angle; a pair of amplifiers coupled between said input circuit and said brushes, each amplifier being coupled to the brushes corresponding with a different pair of diametrically opposite transducers; a pair of circuit completion brushes mounted for cyclically engaging each segment during rotation through said 180-degree angle of the transducer that is diametrically opposite to the segment-corresponding transducer; and four amplifier gain-control means each coupled to a pair of said circuit completion brushes for energization during the passage of said diametrically opposite transducer through said 180-degree angle, each of said last-named means being connected to the appropriate amplifier and being pre-set for controlling the gain of said amplifier according to the individual characteristics of said diametrically opposite transducer so as to produce uniformity of recording by all of said transducers.

References Cited in the file of this patent

"Rotary-Head Switching in the Ampex Video Tape Recorder" by Ray M. Dolby, Journal of the Society of Motion Picture and Television Engineers; vol. 66, No. 4; April 1957, pages 184–188.